Patented Sept. 14, 1943

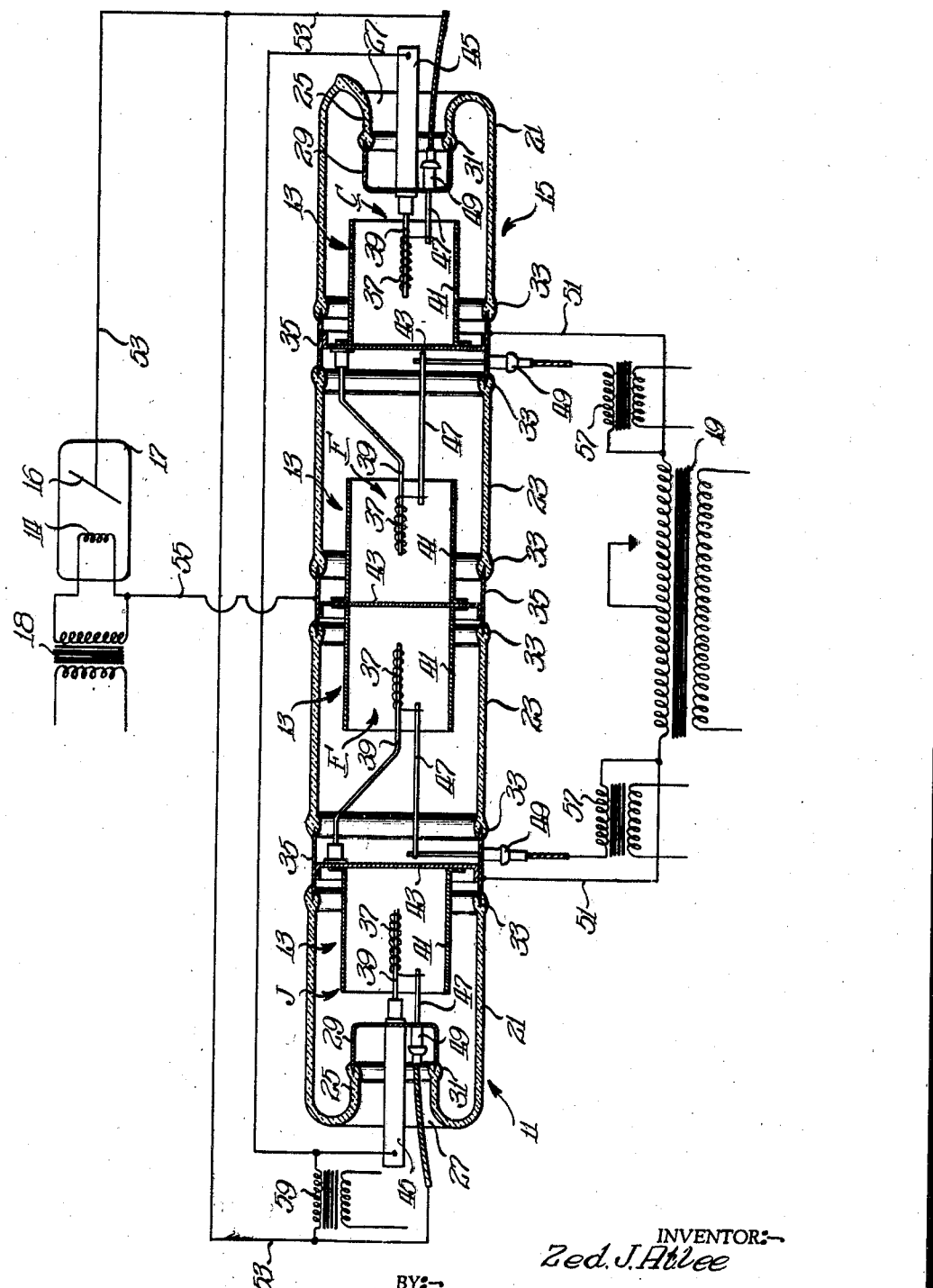

2,329,319

UNITED STATES PATENT OFFICE 2,329,319

ELECTRON FLOW DEVICE

Zed J. Atlee, Elmhurst, Ill., assignor to General Electric X-Ray Corporation, Chicago, Ill., a corporation of New York Application November 12, 1941, Serial No. 418,683

4 Claims. (Cl. 250—27.5)

The present invention relates in general to electronics and has more particular reference to valve rectifier apparatus for converting alternating to unidirectional electrical power.

An important object of the invention is to provide improved rectifier means for accomplishing rectification of alternating current power; a further object being to provide compact rectifying equipment for full wave rectification; a still further object being to combine a plurality of valve rectifier elements in a single compact unit in order to conserve space and simplify the installation of the rectifying apparatus in electrical systems in which recification is required.

Another important object is to provide a rectifier unit comprising a plurality of rectifying elements enclosed in a common envelope whereby to produce a rectifying unit capable of full wave rectification; a further object being to utilize a multiple section envelope in order to facilitate the assembly of the rectifier.

These and numerous other important objects, advantages and inherent functions of the invention will become apparent as the same is more fully understood from the following description, which, taken in connection with the accompanying drawing, discloses a preferred embodiment of the invention.

Referring to the drawing:

The single figure is a sectional view showing a rectifier unit embodying my present invention, together with electrical connections by means of which the rectifier unit may be used in supplying unidirectional electrical power from a source of alternating current power for the operation of an X-ray generator.

To illustrate the invention, I have shown on the drawing a rectifier unit 11 comprising four valve rectifier devices 13 enclosed in common envelope means 15, the devices 13 being electrically interconnected within the envelope and connectible outwardly of the envelope to provide for full wave electrical rectification, whereby to deliver unidirectional power for any desired purpose, such as the operation of an X-ray generator 17, from a source of alternating electrical energy, such as the transformer 19. It should be understood that an X-ray generator, in general, comprises an anode 16 and a usually filamentary cathode 14 which may be energized for electron emission from a suitable electrical power source, such as a transformer 18; and that X-rays may be generated as a result of impingement of the so emitted electrons on the anode under the influence of unidirectional electrical power applied between the anode and cathode. In the system shown herein, unidirectional power is supplied between the anode and cathode of the X-ray generator 17 from an alternating power source 19 through the improved rectifier unit 11 of my present invention.

The possibility of accomplishing electrical rectification by utilizing electron flow between the anode and cathode of an electron valve element is, of course, well known, and the utilization of a plurality of valve elements in a bridge network for full wave rectification is likewise commonly employed in electrical power delivery systems. In order to conserve space, to reduce manufacturing costs, to facilitate the use of rectifier elements in transfer systems, and to obtain other incidental benefits and facilities, I provide a rectifier unit embodying a plurality of rectifier elements electrically interconnected within a common envelope and thereby, in addition to other advantages, I reduce the number of parts required and provide a rectifier unit which is easy to install because it requires the making of a small number of connections, the several rectifier elements being permanently interconnected within the envelope as an incident of its manufacture.

The envelope 15 may, if desired, comprise a unitary, preferably cylindrical casing fitted with end seals, the rectifier elements being suitably supported within the envelope, which may comprise a tubular element of glass. I prefer, however, to utilize an envelope comprising preferably glass sections, including end sections 21 and intermediate sections 23 arranged in axial alignment and in abutting end-to-end relationship. The outwardly facing ends of the end sections 21 are preferably each formed with a re-entrant portion 25 providing a neck defining an opening 27, which is closed by a preferably metallic cup-shaped seal element 29 having edges forming a glass-to-metal seal 31 with the inwardly facing edge of the re-entrant portion 25. The facing ends of adjacent sections 21 and 23 form glass-to-metal seals 33 with the opposite end edges of intermediate bands or sleeves 35, and these bands 35, together with the cup-shaped seal elements 29, preferably comprise material such as nickel steel, which is capable of sealing to glass to form an adequate hermetic envelope seal; and I prefer to use the material known as Fernico in the bands 35 and seal elements 29.

The rectifier elements 13 each comprise a cathode and an anode, the cathode preferably being formed as an electron emitting filament 37 mounted on a suitable support rod 39 which may comprise electrical conducting material and hence serve as means for connecting the filament with a suitable source of filament energizing power.

The anode of each rectifier element 13 preferably comprises a hollow metal sleeve 41 in which the co-operating cathode filament is immersed, that is to say, enclosed. The parts forming the rectifier elements 13 are all enclosed within the envelope 15, the anode sleeves 41 being mounted on preferably plate-like supports 43 which, in turn, are mounted on the walls of the envelope, certain of the filament support stems 39 being mounted on the support plates 43 of adjacent rectifier elements and others being mounted on the end seal elements 29. The anode support members 43, in the illustrated embodiment, comprise plates which are anchored at their edges and electrically connected to the seal rings 35 which comprise conducting material so that the anodes 41 may be electrically connected with electrical power sources externally of the envelope merely by electrically connecting the power sources to the external surfaces of the rings 35.

In the event that an all glass envelope is utilized, the anode supports are anchored on the walls of the envelope and provided with connection leads extending through seals formed in the glass envelope walls adjacent the mounted anode supports.

The rectifier elements 13 include a pair of elements F medially disposed within the envelope and an element J and C at each end of the envelope. The anode sleeves 41 of the medially disposed elements are mounted on and extend in co-axial alignment on opposite sides of one of the plates 43 which forms common support for the anodes of the elements F, the open ends of which face oppositely toward opposed ends of the envelope. The anode members 41 of the elements J and C are each supported on separate members 43 spaced outwardly of the open ends of the anode members of the elements F, the open ends of the anode members of the elements J and C facing the opposite ends of the envelope 15. The cathode support stems 39 of the rectifier elements F are mounted on and electrically connected with the support plates 43 carrying the anode members of the elements J and C so that one side of the filaments 37 of the rectifier elements F may be electrically connected with an external source of power through the support plates 43 of the elements J and C and through the seal rings 35 on which said support plates are mounted.

The filament support stems 39 of the rectifier elements J and C are mounted on posts 45 which extend through and which are sealed in the end seal elements 29 whereby to afford means for electrically connecting one side of the filaments 37 of the rectifier elements J and C with an external source of electrical power. The ends of the filaments 37 of all of the rectifier elements remote from the ends thereof which are supported on the stems 39 are electrically connected with conductor means 47 which extend outwardly of the envelope through seals 49, the conductors 47 which serve the filaments of the rectifier elements J and C being mounted in the end seal elements 29, while the seals 49 serving the conductors 47 of the rectifier elements F are preferably mounted in the seal rings 35 which carry the anode support plates 43 of the rectifier elements J and C.

By energizing the filaments 37 of the rectifier elements 13 from a suitable source or sources of filament energizing power, the filaments may be constituted as electron emitting sources. Electrons emitted by each filament travel to and impinge upon the corresponding anode sleeve 41 and thereby form a conduction path between the anode and cathode of each rectifier unit. This conduction path, however, is of unidirectional character and will permit the flow of electrical current in one direction only between the anode and cathode of each rectifier element 13. For this reason, by electrically connecting, as by the conductors 51, the alternating current power source 19 between the rings 35 which carry the anodes of the rectifier elements J and C and the cathodes of the rectifier elements F, and by connecting the filaments 37 of the rectifier elements J and C, as by conductor means 53, to one side of a unidirectional power load device 17, and by connecting the other side of the power load device, as by means of a conductor 55, with the ring 35 carrying the anodes of the rectifier elements F, unidirectional power may be delivered to the load device 17 in response to alternating current energy supplied from the power source 19, the rectifying unit 11 serving to convert, to unidirectional electrical power, the alternating current energy received from the source of power 19; and the device shown provides for full wave rectification. In order to energize the filaments 37 of the rectifier elements F, suitable sources of filament power, such as the filament transformers 57, may be connected between the conductor 47 of each element F and the rings 35 which carry the plates 43 on which the filament supports 39 of the elements F are mounted. In order to energize the filaments 37 of the elements J and C, a suitable source of filament energizing power, such as the filament transformer 59, may be connected between the rods 45 which carry the filament supports 39 of the elements J and C and the conductors 47 which extend through the end seal elements 29.

After assembly of the parts in the envelope 15, the same may be evacuated and subjected to heat treatment for the removal of all foreign matter, as by attaching the finished envelope to suitable vacuum apparatus while energizing the filaments. After substantially all impurities have been removed from the envelope, it may be hermetically sealed to maintain high vacuum conditions therein, and in order that equal vacuum pressure may prevail within the zones occupied by the several rectifier elements 13, the support plates 43 are preferably formed with openings outwardly of the anode members carried thereby in order that each rectifier section may have atmospheric communication with adjacent sections.

It will be seen from the foregoing that I have provided, in a single compact unit, a full wave rectifier device requiring a minimum number of electrical connections for installation of the same in the electrical network in which rectification is required. It will also be apparent that, by interconnecting the rectifier elements 13 within the envelope 15, I am able not only to conserve space, but also to permanently interconnect the rectifier elements and also eliminate a number of parts required to complete each individual rectifier element if made as a separate unit.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. An electron flow rectifier comprising a plurality of rectifiers enclosed and electrically interconnected within a common envelope, including means forming the anodes of a pair of rectifiers, common support means within said envelope for said anodes, said common support means comprising an electrical conductor on which both anodes are electrically connected, a co-operating cathode associated with each anode, a separate support for each cathode, means on each separate support forming an additional rectifier anode, each such separate support forming common electrical connection with the anode and cathode mounted thereon, and means in said envelope forming a cooperating cathode for each additional rectifier anode.

2. A rectifier comprising an envelope and a plurality of rectifiers, each comprising a co-operating anode and cathode within said envelope, said envelope comprising sleeve-like sections of insulating material in spaced coaxial alignment and seal members including end seals and intermediate bands of conducting material, said bands being each sealingly interconnected between the abutting ends of adjacent sections, the anodes of a pair of said rectifiers being supported in oppositely facing relationship in the envelope and commonly mounted on and electrically connected with one of said seal members.

3. A rectifier comprising an envelope and a plurality of rectifiers, each comprising a co-operating anode and cathode within said envelope, said envelope comprising sleeve-like sections of insulating material in spaced coaxial alignment and seal members including end seals and intermediate bands of conducting material, said bands being each sealingly interconnected between the abutting ends of adjacent sections, the anodes of a pair of said rectifiers being supported in oppositely facing relationship in the envelope and commonly mounted on and electrically connected with one of said seal members, and means forming the co-operating cathodes of said pair of rectifiers, each cathode being mounted on and electrically connected to another of said seal members.

4. A rectifier comprising an envelope and a plurality of rectifiers, each comprising a co-operating anode and cathode within said envelope, said envelope comprising sleeve-like sections of insulating material in spaced coaxial alignment and seal members including end seals and intermediate bands of conducting material, said bands being each sealingly interconnected between the abutting ends of adjacent sections, the anodes of a pair of said rectifiers being commonly mounted on and electrically connected with one of said seal members, means forming the co-operating cathodes of said pair of rectifiers, each cathode being mounted on and electrically connected to another of said seal members, and means forming the anode of another rectifier supported on and electrically connected to each of said cathode supporting seal members.

ZED J. ATLEE.